US010771944B2

United States Patent
Shaw et al.

(10) Patent No.: US 10,771,944 B2
(45) Date of Patent: Sep. 8, 2020

(54) METHOD AND SYSTEM FOR MULTIPOINT ACCESS WITHIN A MOBILE NETWORK

(71) Applicant: AT&T INTELLECTUAL PROPERTY I, L.P., Atlanta, GA (US)

(72) Inventors: Venson Shaw, Kirkland, WA (US); Sangar Dowlatkhah, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 526 days.

(21) Appl. No.: 15/590,646

(22) Filed: May 9, 2017

(65) Prior Publication Data

US 2018/0331884 A1 Nov. 15, 2018

(51) Int. Cl.
| | |
|---|---|
| H04W 4/70 | (2018.01) |
| H04W 84/02 | (2009.01) |
| H04W 28/02 | (2009.01) |
| H04W 84/18 | (2009.01) |
| H04L 29/08 | (2006.01) |
| H04L 12/707 | (2013.01) |
| H04L 12/721 | (2013.01) |
| H04L 12/715 | (2013.01) |
| H04W 92/18 | (2009.01) |
| H04L 12/725 | (2013.01) |

(52) U.S. Cl.
CPC .............. *H04W 4/70* (2018.02); *H04L 45/24* (2013.01); *H04L 45/38* (2013.01); *H04L 45/64* (2013.01); *H04L 67/1042* (2013.01); *H04L 67/141* (2013.01); *H04L 67/16* (2013.01); *H04W 28/021* (2013.01); *H04W 84/02* (2013.01); *H04W 84/18* (2013.01); *H04L 45/3065* (2013.01); *H04W 92/18* (2013.01)

(58) Field of Classification Search
CPC ............. H04L 12/4666; H04L 45/7453; H04L 67/141; H04L 67/16; H04L 45/3065; H04W 84/02; H04W 92/18
See application file for complete search history.

(56) References Cited

U.S. PATENT DOCUMENTS

| | | | |
|---|---|---|---|
| 9,350,818 B2 | 5/2016 | Asnis | |
| 9,479,511 B2 | 10/2016 | Dittrich et al. | |
| 9,680,888 B2 | 6/2017 | Vasudevan et al. | |
| 9,734,287 B2 | 8/2017 | Linn et al. | |
| 2009/0259493 A1 | 10/2009 | Venon et al. | |
| 2010/0226368 A1* | 9/2010 | Mack-Crane | H04L 12/4666 370/390 |
| 2012/0277543 A1 | 11/2012 | Homchowdhury et al. | |

(Continued)

*Primary Examiner* — Kyung H Shin
(74) *Attorney, Agent, or Firm* — Guntin & Gust, PLC; Jay Anderson

(57) ABSTRACT

Aspects of the subject disclosure may include, for example, identifying a packet data protocol session that supports a first data exchange between a mobile application of a first mobile device and a first recipient device, wherein the first exchange of data comprises a directing of the first exchange of data through a network device. A second recipient device is determined, and a second data exchange is facilitated between the mobile application and the second recipient device by way of the packet data protocol session, wherein the second exchange of data also comprises a directing of the second exchange of data through the network device without modifying the first data exchange. Other embodiments are disclosed.

20 Claims, 7 Drawing Sheets

(56) References Cited

U.S. PATENT DOCUMENTS

| | | |
|---|---|---|
| 2014/0331273 A1 | 11/2014 | Koneru et al. |
| 2015/0121250 A1 | 4/2015 | Waxman et al. |
| 2015/0188956 A1 | 7/2015 | Chauhan et al. |
| 2015/0286791 A1 | 10/2015 | Altobello et al. |
| 2015/0296368 A1 | 10/2015 | Kaufman et al. |
| 2016/0261473 A1 | 9/2016 | Gupta et al. |
| 2017/0063949 A1 | 3/2017 | Dowlatkhah et al. |
| 2017/0244637 A1* | 8/2017 | Singhal ............... H04L 45/7453 |
| 2018/0183708 A1* | 6/2018 | Farkas ................... H04L 45/38 |

* cited by examiner

200

300

METHOD AND SYSTEM FOR MULTIPOINT ACCESS WITHIN A MOBILE NETWORK

BACKGROUND

Mobile applications are accessible by wireless communication devices, such as mobile phones, tablets, and more generally, any network accessible device, e.g., according to the Internet of Things (IoT). Depending upon the application and/or operating scenario an example connected, or "smart" device is able to connect to multiple destinations, e.g., another device, a secure database server, and/or a secure streaming server, through a common packet data protocol session. In managing such data exchanges, one secure connection is torn down before another segregated secure connection is set up.

In some applications, distribution of data, such as multimedia, text and the like, occurs using publicly accessible applications, such as various popular social media applications. In some instances, however, such data exchanges can be subject to monitoring, censoring and/or restrictions, e.g., imposed by an employer, and/or another agency, such as a government agency, e.g., a school, a library, and so on. Accordingly, distribution of information such as pictures and videos to a large number of users and/or subscribers can be subject to restrictions beyond an individual's control.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for enabling an application to have multiple segregated data sessions, including secure data sessions, from the same packet data protocol session to multiple destinations. Other embodiments are described in the subject disclosure.

One or more aspects of the subject disclosure include a device, having a processing system that includes a processor, and a memory that stores executable instructions. The instructions, when executed by the processing system, facilitate performance of operations, including identifying a packet data protocol session that supports a first exchange of data between a mobile application of a first mobile device and a first recipient device, by way of a network element. A second recipient device is identified, and a second exchange of data is initiated between the mobile application and the second recipient device by way of the packet data protocol session, without modifying the first exchange of data.

One or more aspects of the subject disclosure include a process that includes determining, by a processing system including a processor, a packet data protocol session that supports a first exchange of data between a mobile application of a first mobile device and a first recipient device, by way of a network element. A second recipient device is determined by the processing, and a second exchange of data is also facilitated, by the processing system, between the mobile application and the second recipient device by way of the packet data protocol session, without modifying the first exchange of data.

One or more aspects of the subject disclosure include a machine-readable storage device, comprising executable instructions that, when executed by a processing system including a processor, facilitate performance of operations, including identifying a packet data protocol session that supports a first data exchange between a mobile application of a first mobile device and a first recipient device, by way of a network device; determining a second recipient device; and facilitating a second data exchange between the mobile application and the second recipient device by way of the packet data protocol session, without modifying the first data exchange.

Figure 1:
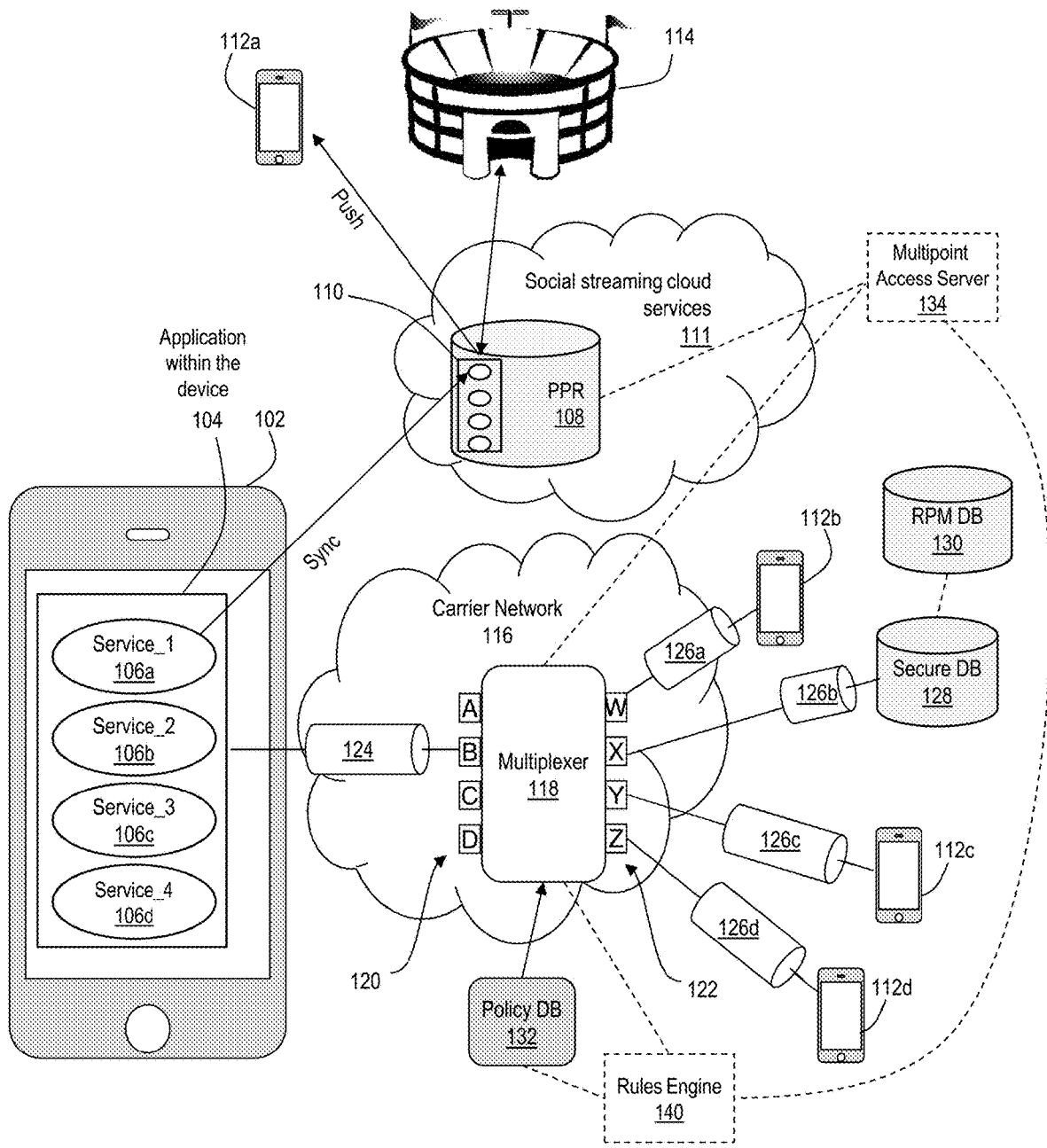
FIG. 1 depicts an illustrative embodiment of a mobile communication system that supports multipoint access.

FIG. 1 depicts an illustrative embodiment of a mobile communication system 100 that supports multipoint access. A first mobile communication device 102 includes at least one mobile application 104 adapted to access one or more network-accessible services 106a, 106b, 106c, 106d, generally 106. In some embodiments, the system includes a privacy profile register 108 that includes information obtained from the services 106 accessed by the mobile application 104 of the first mobile communication device 102a. For example, the privacy profile register 108 can be used to facilitate access to information from the application 104, by way of a streaming cloud service, e.g., a social streaming cloud service 111.

By way of example, the privacy profile register 108 can include information 100 that is synchronized with one or more of the mobile application 104, the services 106 used by the mobile application 104, or a combination thereof. Consider a user engaged in a communication session based on the mobile application 104, as information is entered, forwarded, received and/or otherwise modified through the mobile device, corresponding information 110 of the privacy profile register 108 is updated, e.g., synchronized. Accordingly, information and/or status of the services 106 and/or the application 104 of the mobile device are available in an up-to-date manner at the privacy profile register 108.

In at least some embodiments, the privacy profile register 108 can transfer, forward, or otherwise push information, such as the synchronized information 110, to another mobile device 112a. In some embodiments, the information 110 can be pushed continuously, allowing the other mobile device 112a to follow operation of the mobile application 104 and/or services 106 of the first mobile device 102. Alternatively or in addition, some and/or all of the information 110 can be pushed periodically, e.g., according to a schedule and/or based on an event. To the extent the communications and/or operation of the mobile application 104 and/or the services 106 are interrupted or otherwise compromised, the other mobile device 112a can establish a point-to-point link that serves as a vehicle to exchange information with one or more recipient or destination devices, e.g., other mobile devices 112*b*, 112*c*, 112*d*, generally 112, a secure database 128, and/or other recipient devices.

Alternatively or in addition, the privacy profile register 108 can facilitate an exchange of data between the mobile device 102, one or more mobile devices at the event 114, and/or other recipient devices 112. Data exchange can include, for example, streaming video and/or audio associated with the event, e.g., video of a portion of a live sporting event obtained from equipment at the event 114 and distributed to other equipment, e.g., one or more of the mobile device 102 or the other mobile devices 212. In at least some embodiments, streaming media from equipment at the event is accessed by way of a service 106 at the first mobile device 102. According to the techniques disclosed herein, the streaming media from the event 114 is distributed or otherwise shared with one or more other recipient devices, such as the mobile devices 112.

The system 100 further includes a carrier network 116 that facilitates communications between and/or among one or more of the first mobile device 102, the other mobile devices 112, and/or other recipient devices. Other recipient devices can include, without limitation, one or more of a secure database 128, an RPM database 130, fixed recipient devices, e.g., workstations, datacenters, enterprise networks, servers, and other networks.

In at least some embodiments, the system 100 includes a network element or device 118. The network element 118 can include, without limitation, one or more of a data selector and/or data switch, e.g., a multiplexer 118. In the illustrative example, the multiplexer includes a first series of ports 120 associated with one or more data sources, e.g., source ports 120: A, B, C, D, and a second series of ports 122 associated with one or more distribution targets, e.g., data destinations, including destination ports 122: W, X, Y, Z. In operation, an originating data device, e.g., the first mobile device 102, establishes an originating point-to-point (PTP) packet data connection 124 between the first mobile device 102 and a source port 120, e.g., source port B. The originating PTP connection 124 can be conveyed by any suitable networking means, including fixed terrestrial networks, e.g., fiberoptic networks, satellite networks, wireless networks, including mobile radio networks, including 3GPP networks, e.g., 2G, 3G, 4G, LTE, LTE-A, 5G and/or non-3GPP networks, e.g., WiFi, Bluetooth, and so on. Generally speaking, the networking means can include one or more of wide area networks, e.g., the Internet, metropolitan networks, local area networks, personal area networks, public networks, private networks, and the like.

It is understood that in at least some embodiments, the originating PTP connection 124 can include a security protocol, e.g., IP sec, encryption, and the like. The multiplexer 118 applies port forwarding to establish an association between the source port B and one or more distribution ports 122, e.g., ports W, X, Y and Z. In the illustrative example, a first distribution data connection, e.g., PTP link 126*a*, is established between the first distribution port W and a second mobile device 112*b*. A second distribution data connection, e.g., PTP link 126*b*, is established between the second distribution port X and the secure database 128. Likewise, third and fourth distribution data connections, e.g., PTP links 126*c*, 126*d*, are respectively established between the third and fourth distribution portions Y, Z and the third and fourth mobile devices 112*c*, 112*d*.

Ends of the originating PTP connection 124 include the application 104 and/or service 106 of the first mobile device 102 and source port B of the multiplexer 118. It is understood that an encryption protocol can be applied to this connection 124 to guard against unauthorized interception and/or access to exchanged data. The multiplexer 118 applies one or more port forwarding algorithms to forward data between the source port B and those distribution ports 122 employed in a distribution of data to equipment 112, 130 of intended recipients. The same and/or different security, e.g., encryption protocols can be applied to the PTP links between the distribution ports 122 and the recipient devices 112, 130, e.g., to further guard against unauthorized interception and/or access to the exchanged data.

Accordingly, a single application 106 can instantiate multiple media-exchange connectivity within a single packet data protocol connection session 124 by sending each secure connection 126 to a different predefined port 122 in the multiplexer 118. By way of example, the media exchange connectivity is based on a media exchange application 106, such as WebRTC.

In at least some embodiments, the system 100 includes a multipoint access server 134 (shown in phantom). The multipoint access server 134 can be in communication with one or more of the privacy profile register 108, the multiplexer 118, the originating device, e.g., the first mobile device 102 and one or more of equipment of the recipient devices 112, 128. The multipoint access server 134, when provided, can participate in configuration of the multiplexer 118 and/or the rules engine 140. The configuration can be based on user preferences, authorization information, rules, and the like, e.g., obtained from one or more of the rules engine 140, the policy database, 132, the privacy profile register 108 and or the network devices 102, 112, 130.

It is understood that one or more of the multiplexer 118, the policy database, 132, the rules engine 140, and/or the multipoint access server 134 can be operated and/or otherwise controlled by the same entity or different entities. The entities can include, without limitation, a mobile service provider, a service layer service provider, and/or a subscribed service provider, e.g., a third party unaffiliated with the carrier network 116 and/or the social streaming cloud services. In at least some embodiments, the multipoint access is provided as an over-the-top service to users of the carrier network 116.

In at least some embodiments, the system 100 includes a policy database. The policy database can include one or more predetermined policies that can be applied to multipoint distribution of data, e.g., streaming media, between an originating device 102 and one or more destination devices 112, 128. Policies can be identified and/or otherwise stored within the policy database 132. These policies can be applied and/or imposed by the system 100, e.g., by the multiplexer 118 and/or the multipoint access server 134.

In some embodiments, the system can include a rules engine 140 (shown in phantom). The rules engine 140 is in communication with one or more of the policy database 132, the multiplexer 118, and the multipoint access server 134. The rules engine 140 can receive policy information from the policy database 132 and identify one or more rules based on the policy information. The rules engine 140 can apply or otherwise impose the one or more rules related to multipoint data exchanges. The rules can allow and/or deny port authorization and/or port forwarding. Alternatively or in addition, the rules can allow and/or deny participation of source and/or destination equipment 102, 112, 128. For example, policies may be related to a user's access authorization, e.g., a subscription, equipment capabilities, allowing requests for multipoint access to be serviced while the authorization is valid. Alternatively or in addition the rules can be based on one or more of various factors, such as service level agreements of the originating user and/or the requesting user(s). Other factors can include network conditions, e.g., restricting distribution based on congestion conditions, equipment capabilities, e.g., whether a requesting device is capable of receiving or accessing the requested data. Equipment capabilities can include one or more of radio type, mobility network software support, screen resolutions, available data, etc. Other factors can include a number of requesting users, e.g., a threshold of supported recipients may be established after which further requests are denied, at least until the number of recipients falls below the threshold, and/or the threshold is increased. Still other factor can include a priority level of the distributed data, the originating user and/or the recipient user, a location of the originating and/or requesting recipient device, and the like.

It is understood that in some instances, the first mobile device 102 can originate streaming media, e.g., video captured from a camera of the first mobile device 102, and/or audio captured from a microphone of the first mobile device 102. By way of example, a report may use a personal mobile communication device 102 to report on an event. The event might be a sporting event, or some other social event, e.g., including situations involving civil unrest. It is understood that some actors, e.g., governments, may attempt to censor, restrict and/or identify sources of information. To this end, such actors might impose restrictions on applications and/or services, such as Facebook®, Twitter® and/or Instagram®, to monitor, identify, censor and/or restrict certain data transfers. Beneficially, the techniques disclosed herein facilitate multipoint access or dissemination of information based on the first mobile device 102.

Alternatively or in addition, other information from sensors of the first mobile device, such as geolocation, acceleration, speed, temperature, medical information, such as body temperature, heart rate, EKG, blood sugar level, blood oxygen level and the like.

Although the term recipient device is used in the illustrative examples, it is not meant to limit or otherwise suggest any limitation of a direction of data flow, an initiator or source of a data session versus a target of a data session, a calling party versus a called party, etc. For example, the first mobile device may initiate a first bidirectional data session, e.g., a first VoIP call to the first recipient device, followed by initiation of a second VoIP call to the second recipient device. Alternatively or in addition, the mobile device may be a recipient of a first data session, e.g., a first VoIP call from the first recipient device, followed by initiation of the second VoIP call. Without restriction, initiation of the second data session, e.g., VoIP call, can result from action of any of the participating devices, e.g., the first mobile device, the first recipient device, or the second recipient device. Alternatively or in addition, any of the data sessions can be initiated by another source, such as an operator, an application, a third party subscriber, etc. Moreover, the data sessions can include bidirectional data sessions, such as the VoIP calls, or unidirectional sessions, such as streaming video, audio, file transfer, download, upload, etc., in any direction, between any of the participating devices.

Figure 2:
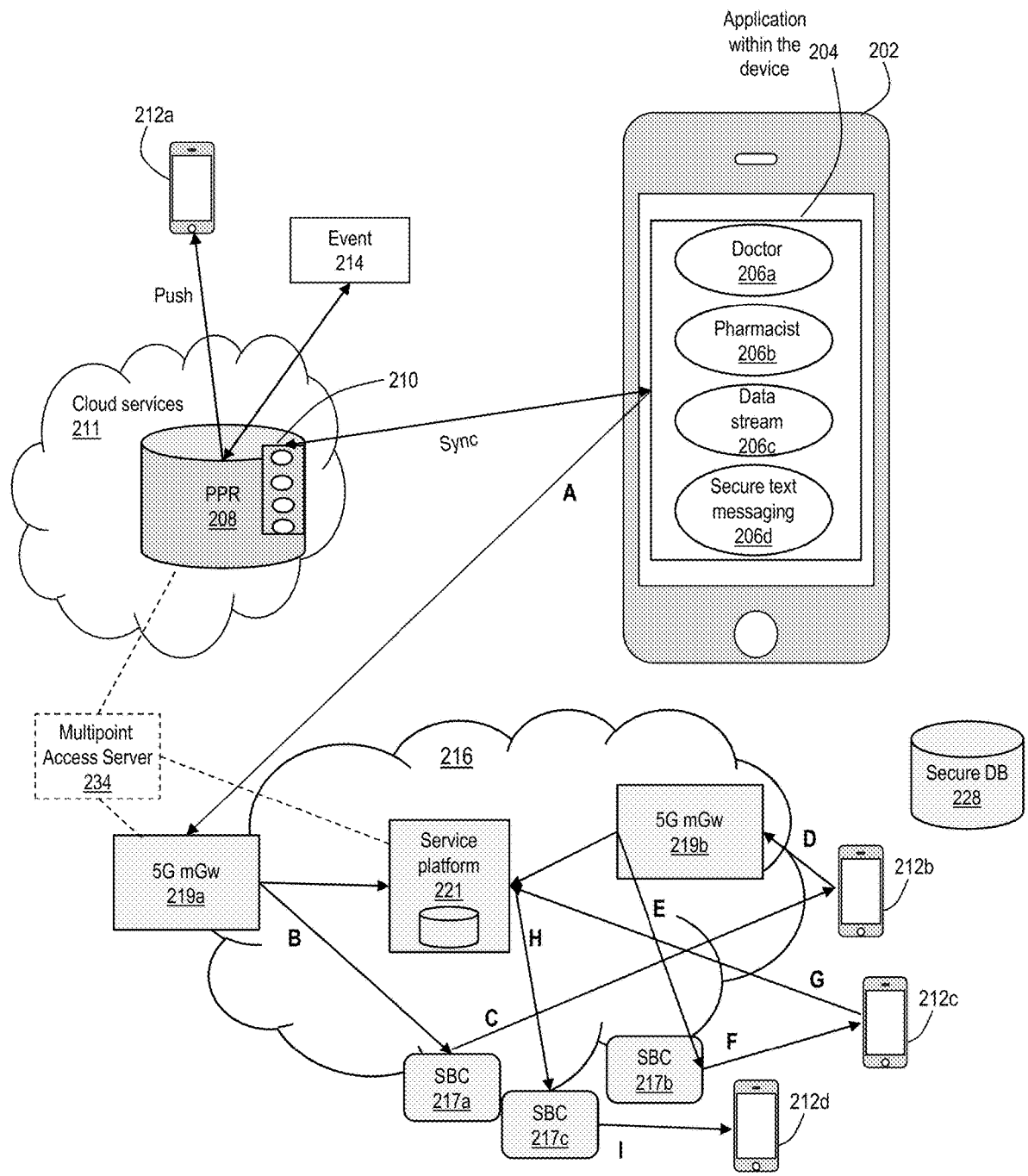
FIG. 2 depicts an illustrative embodiment of another mobile communication system that supports multipoint access.

FIG. 2 depicts an illustrative embodiment of another mobile communication system 200 that supports multipoint access. The system 200 includes a first mobile communication device 202 having at least one mobile application 204 adapted to access one or more network-accessible services 206a, 206b, 206c, 206d, generally 206. In some embodiments, the system 200 includes a privacy profile register 208 that includes information obtained from the services 206 accessed by the mobile application 204 of the first mobile communication device 202a. For example, the privacy profile register 208 can be used to facilitate access to information from the application 204, by way of a cloud service 211.

The privacy profile register 208 can include information 210 that is synchronized with one or more of the mobile application 204, the services 206 used by the mobile application 204, or a combination thereof. In at least some embodiments, the privacy profile register 208 can transfer, forward, or otherwise push information, such as the synchronized information 210, to another mobile device 212a. In some embodiments, the information 110 can be pushed continuously, allowing the other mobile device 112a to follow operation of the mobile application 204 and/or services 206 of the first mobile device 202. Alternatively or in addition, some and/or all of the information 210 can be pushed periodically, e.g., according to a schedule and/or based on an event. To the extent the communications and/or operation of the mobile application 204 and/or the services 106 are interrupted or otherwise compromised, the other mobile device 212a can establish a point-to-point link that serves as a vehicle to exchange information with one or more recipient or destination devices, e.g., other mobile devices 212b, 212c, 212d, generally 212, a secure database 228, and/or other recipient devices.

Alternatively or in addition, the privacy profile register 208 can facilitate an exchange of data between the mobile device 202, one or more mobile devices at the event 214, and/or other recipient devices 212. Data exchange can include, for example, streaming video and/or audio associated with the event, e.g., video of a portion of a live sporting event obtained from equipment at the event 214 and distributed to other equipment, e.g., one or more of the mobile device 202 or the other mobile devices 212.

The system 200 further includes a carrier network 216 that facilitates communications between and/or among one or more of the first mobile device 202, the other mobile devices 212, and/or other recipient devices. The carrier network 216 can include terrestrial networks, e.g., cable and/or fiberoptic networks, satellite networks, wireless networks, including mobile radio networks, including 3GPP networks, e.g., 2G, 3G, 4G, LTE, LTE-A, 5G and/or non-3GPP networks, e.g., WiFi, Bluetooth, and so on. Other recipient devices can include, without limitation, one or more of a secure database 228, fixed recipient devices, e.g., workstations, datacenters, enterprise networks, servers, and other networks.

According to the illustrative example, the network 216 includes an adaptable network, such as a software defined network (SDN). SDN architectures can include a service layer that defines, identifies or otherwise instantiates one or more network infrastructures. The infrastructures can include virtual machines adapted to provide network functions alone or in combination with traditional network elements. In a 3GPP 5G scenario, the different network infrastructures are referred to generally as "slices." One or more slices of a network can be configured to respective provide a predetermined level or type of network service. By way of example, available network slices can be based on types of applications, priorities of users and/or data type, service level agreements, network congestion, subscription levels, and the like.

Examples of network slices applied in 5G scenarios are disclosed in U.S. patent application Ser. No. 15/351,618, entitled "Method and Apparatus for Dynamic Network Routing in a Software Defined Network," filed on Nov. 15, 2016, and incorporated herein by reference in its entirety.

SDN networks, such as the illustrative 5G example networks, typically include a network access and/or coordination device, referred to herein as a management gateway. A first 5G management gateway 219a is associated with the first mobile device 202. The 5G management gateway 219a coordinates access to network services, including modifications to network services as may be required during a course of operations. The management gateway 219a can facilitate access to one or more slices of the example 5G network based on requirements of the one or more services 206 of the example application. It is understood that all services can be provided by a single slice, or by a combination of more than one slices. Combinations of network slices can be based on network availability, network management, and/or requirements related to the service request, such as priorities, data type, application type, and so on.

The system includes a second 5G management gateway 219 servicing one of the destination mobile devices 212b. The network 216 also includes session border control devices 217a, 217b, 217c, generally 217. Session border control devices 217 can be deployed, e.g., in streaming media scenarios, such as VoIP, in which the session border controller device 217 exert control over related signaling and sometimes media streams, involved in setting up, conducting and/or tearing down media communications, including interactive media communications, such as VoIP.

Some networks 116, 216, such as the example 5G networks, separate control signaling, handled by network resources sometimes referred to as a "control plane" from exchanges of user data, handled by network resources sometimes referred to as a "user plane." Beneficially, separation of the control and user planes allows the network to establish requested connectivity and/or reconfigure, as required, without interrupting exchanges of data according to the user plane. In particular, it is understood that the techniques disclosed here, e.g., in relation to the systems 100, 200 of FIGS. 1 and 2, can add and/or drop recipient devices to an already established, and in at least some instances, active data exchange.

The system 200 also includes an optional multipoint access server 234 (shown in phantom) and a service platform 221. The multipoint access server 234, when provided, can be in communication with one or more of the privacy profile register 208, the 5G management gateway 219 and/or the service platform 221. The multipoint access server 234 can facilitate a preferred flow of information from a source application 204 of a source device 202 to one or more destination devices 212 over the carrier network.

Instead of using a switch or multiplexer configured with port forwarding, the present example, uses a forwarding technique. Namely, the source device 212, or an application 204 of the source device 212, establishes a first packet data protocol session in a point-to-point link to a destination device. The destination device can include one of the destination mobile devices 212, e.g., directly and/or by way of another device, such as one or more of the session border controllers 217 and/or the 5G management gateway 219b. In at least some embodiments, a first PDP session "A" between the source device 202 and the 5G management gateway 219a, can include a security protocol, e.g., IP Sec or any suitable form of encryption, including proprietary encryption, government encryption, commercial encryption, public key encryption, and so on.

The first 5G management gateway 219a, in turn, establishes a point-to-point link with a first one of the other mobile devices 212b by way of a first session boarder controller 217a, along network links "B" & "C." The first one of the other mobile devices 212b, in turn, forwards the information to one or more other destinations by way of other point-to-point links. In the illustrative example, the first one of the other mobile devices 212b establishes a point-to-point link with a second one of the other mobile devices 212c by way of a second 5G management gateway 219b and a second session boarder controller 217b, along network links "D," "E" & "F."

The process can continue in a similar manner to extend to one or many other recipient devices, access to a data exchange associated with the originating mobile device 202 and using the first point-to-point link "A." Such an arrangement is sometimes casually referred to as a "daisy chan." Continuing with the illustrative example, the second one of the other mobile devices 212c establishes a point-to-point link with a third one of the other mobile devices 212d by way of the service platform 221 and a third session boarder controller 217c, along network links "G," "H" & "I."

In some applications, each of the devices 202, 212 incudes a respective list of recipient(s), e.g., recipient devices, to be used in forwarding media based on the originating device 202. Alternatively or in addition, the originating device 202 includes a list with multiple recipients that can include all or fewer than all recipients. A first point-to-point link with one of the listed recipients is instantiated. The list of recipients can be modified to identify that a distribution requirement and/or request associated with the one of the listed recipients has been satisfied, e.g., crossed off the list. The one of the listed recipients identifies a second one of the remaining listed recipients and facilitates establishment of a data session, e.g., a point-to-point link, with the second one of the remaining listed recipients. The remaining list of recipients can be further modified to reflect that the second one of the remaining listed recipients has been serviced. The process can continue in a like manner extending to as many, if not all, of the listed recipients.

Alternatively or in addition, a preferred distribution chain of the listed recipient devices can be identified or otherwise imposed by at least one device, e.g., the originating mobile device 202, the multipoint access server 234, the privacy profile register 208 and the like.

In at least some embodiments, media data associated with the application 204 of the originating device 202 is directed to a network storage location, such as a secure database 228. The data can be distributed in a like manner, e.g., using a chain of data sessions. It is understood that the media data, once stored, can be accessed and/or further distributed coincidentally, or a later time, by one or more of equipment of the same recipient devices and/or different recipient devices. For example, other equipment may place requests that are serviced after a data distribution has been initiated. It is understood that such later requests can be serviced from the secure database 228, e.g., as if it were the originating recipient device. Namely, a first data session can be initiated from the secure database 228, and distributed according to the techniques disclosed herein, including the example systems 100, 200 of FIGS. 1 and 2.

Figure 3:
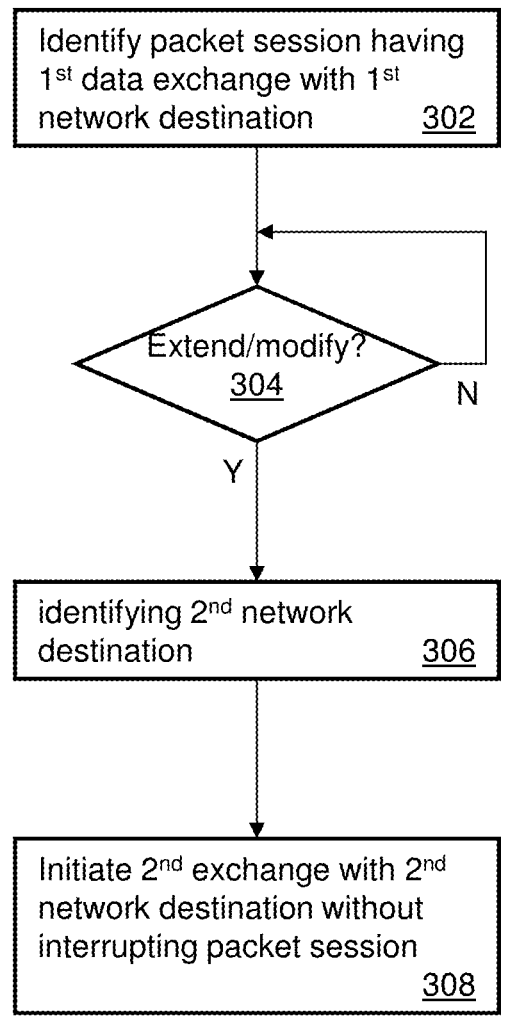
FIG. 3 depicts an illustrative embodiment of a process used in portions of the systems described in FIGS. 1 and 2.

FIG. 3 depicts an illustrative embodiment of a process 300 used in portions of the systems described in FIGS. 1 and 2. The process 300 identifies packet session having first data exchange between a reference network device and a recipient device at 302. The reference network device can be any network accessible device, such as a mobile device, e.g., a wireless device, or a fixed device. Wireless mobile devices can include, without limitation, a mobile phone, a connected device of a home, e.g., a security sensor, a lock and/or lighting controls, a vehicle, e.g., providing roadside assistance, manufacturer tracking, toll collections, a business, e.g., including business automation, point of sale devices, manufacturing controls, enterprise networks, and the like.

The exchange of data can be based on a service accessed by the reference network device. Services can include, without limitation, subscribed services, such as network services, e.g., VoIP, data, video, file transfer, short message service, multimedia message service, email, file transfer service using a file transfer protocol, web browsing, e.g., based on hypertext transfer protocol, and the like. In at least some embodiments, the data exchange includes a data session. The data session can include streaming media, such as voice and/or video.

The data session can be associated with one or more applications accessed by the reference network device. For example, the reference network device can participate in a WebRTC session including vide and/or voice exchanged by way of web browsers of the reference network device and any recipient device.

A determination is made at 304, as to whether an extension and/or modification is necessary. Examples of extensions and/or modifications can include an identification of any other recipient devices that should participate in the aforementioned packet or data session. For example, it may be requested or otherwise determined that access to the WebRTC session should be provided to one or more other recipient devices. Identification of any recipient devices can be obtained by equipment of an originating user, e.g., the first mobile device 102, 202 (FIGS. 1-2). For example, the first mobile device 102, 202 can include an application that accepts a user input, e.g., through a user interface, identifying one or more recipient devices.

Such identifications can be made based on any of a variety of techniques, such as identification of a network reference and/or address of the recipient device, identification of a user or group of users and the like. In some embodiments, a user can select recipient devices, e.g., users, from a local address book, a predetermined distribution list, a modifiable list, e.g., allowing recipients to be added and/or dropped based on a previously defined list, and the like.

Alternatively or in addition, the identification of recipient devices can be based on requests. The requests can be received from other devices and/or systems, such as the equipment of other recipient devices, a data session coordinator, e.g., a service and/or application, an employer, a friend or family, a subscriber, etc. In at least some embodiments, requests are presented to an originating user and/or a session controller. For example, the requests can be presented in a table, a drop-down list, and the like. The originating user and/or session controller can be presented with an option to accept or deny the entire list. Alternatively or in addition the individual members and/or groups of members can be authorized and/or excluded based on their identification in a listing of requesters.

To the extent a request to extend and/or modify the recipients is detected at 304, the process 300 proceeds to 306. Otherwise, the process 300 can continue to monitor at 304. A second recipient device is identified at 306. In some embodiments, the second recipient device includes a group of recipient devices, e.g., two or more additional recipient devices.

A subsequent data exchange is initiated with second recipient device and/or group of recipient devices at 308, without interrupting packet session.

It is understood that in at least some embodiments, the determining of the request to extend and/or modify occurs prior to or at a time of initiation of a data session of the first data exchange. Accordingly, the recipient devices and corresponding point-to-point links can be configured at an initiation time. Alternatively or in addition, the determining of the request to extend and/or modify occurs after a data session of the first data exchange has been established. Namely, data is being exchanged, e.g., in a PDP session, between the reference network device and at least one destination network device before the request to extend or modify is determined at 304. In establishing subsequent data connections, e.g., point-to-point links to service the second recipient device(s), this can be accomplished without a need for tearing down, interrupting and/or otherwise disturbing the first packet session. It is understood that the initiation of the second data exchange can include any of the example techniques disclosed herein, such as the multiplexer using a port-forwarding algorithm, the daisy-chain, in which equipment of the first recipient device establishes a data connection, e.g., a second point-to-point link with the second recipient device allowing data obtained by the equipment of the first recipient device to be provided to the equipment of the second recipient device by way of the second point-to-point link, without interrupting operations of the first point-to-point link.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Beneficially, the illustrative techniques disclosed herein provide an ability to communicate with other recipient devices, e.g., subscribers, securely and efficiently. Such communications provide an ability to bypass regular social media network to share content with select number of recipient devices, e.g., including equipment associated with a predefined individuals. The techniques disclosed herein provide an ability to share private information, e.g., corporate information, with a relatively large number of people securely without risk of leaks in outside any particular group. By way of reference, the numbers of distributions can be a handful, scores, hundreds, thousands, tens of thousands, or more.

In at least some embodiments, other features include an ability to dynamically change the list of recipients while sending the content, an ability to store and use online backup in a secure cloud storage for any given media while gathering the information and transmitting to the list.

Figure 4:
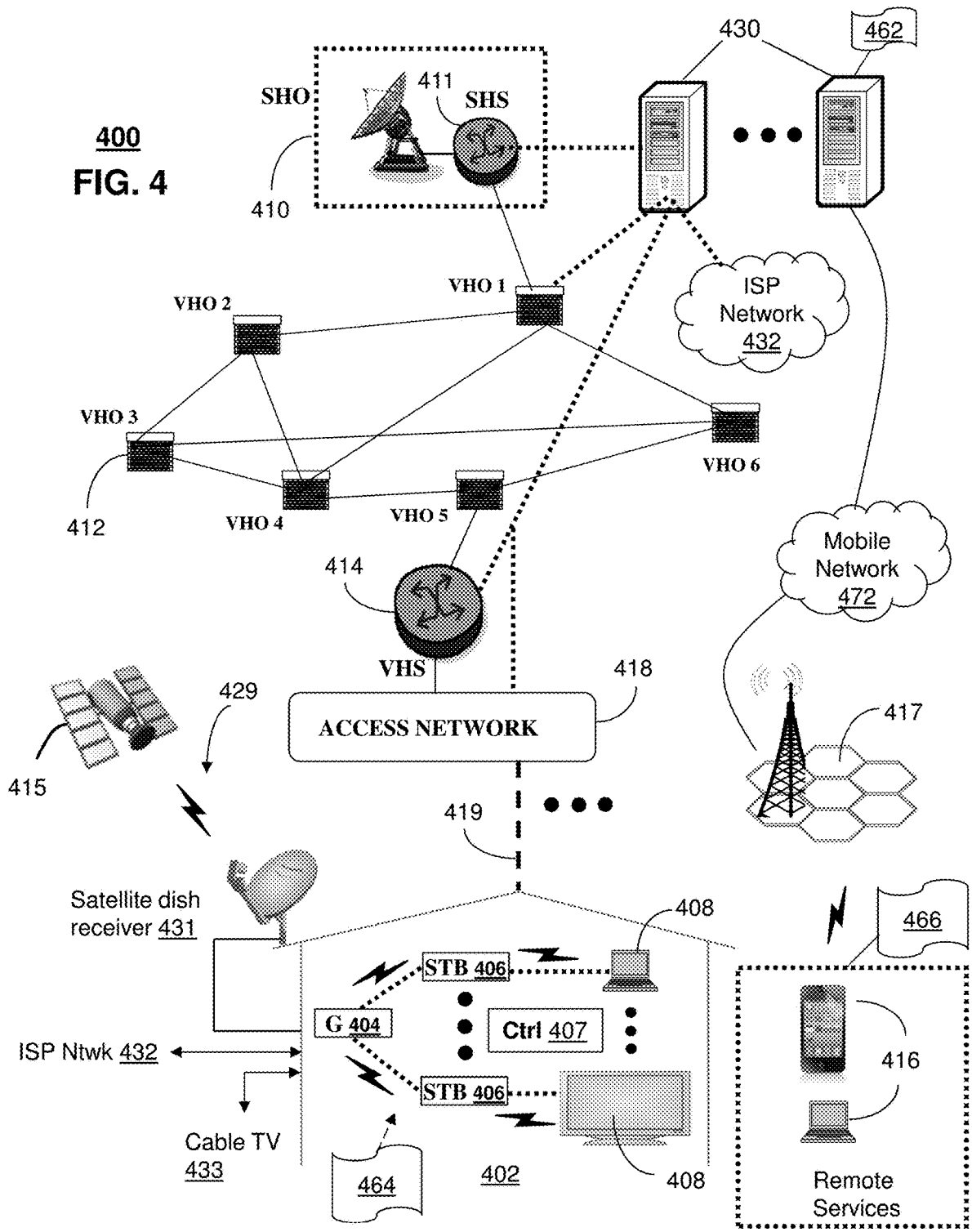
FIGS. 4-5 depict illustrative embodiments of communication systems that provide media services that support multipoint access.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with mobile communication systems that supports multipoint access of FIGS. 1 and/or 2 as another representative embodiment of communication system 400. For instance, one or more devices illustrated in the communication system 400 of FIG. 4 can identify a packet data protocol session that supports a first data exchange between a mobile application of a first mobile device and a first recipient device, determine a second recipient device, and facilitate a second data exchange between the mobile application and the second recipient device by way of the packet data protocol session, without modifying the first data exchange.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a device that supports multipoint access in a mobile communication system (herein referred to as a multipoint access server 430). The multipoint access server 430 can use computing and communication technology to perform function 462, which can include among other things, the multipoint access techniques described by process 300 of FIG. 3. For instance, function 462 of multipoint access server 430 can be similar to the functions described for the multipoint access servers 134, 234 of FIGS. 1, 2 in accordance with process 300. The media processors 406 and wireless communication devices 416 can be provisioned with software functions 464 and 466, respectively, to utilize the services of multipoint access server 430. For instance, functions 464 and 466 of media processors 406 and wireless communication devices 416 can be similar to the functions described for the communication devices 102, 202, 112, 212 of FIGS. 1-2 in accordance with the process 300, FIG. 3.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
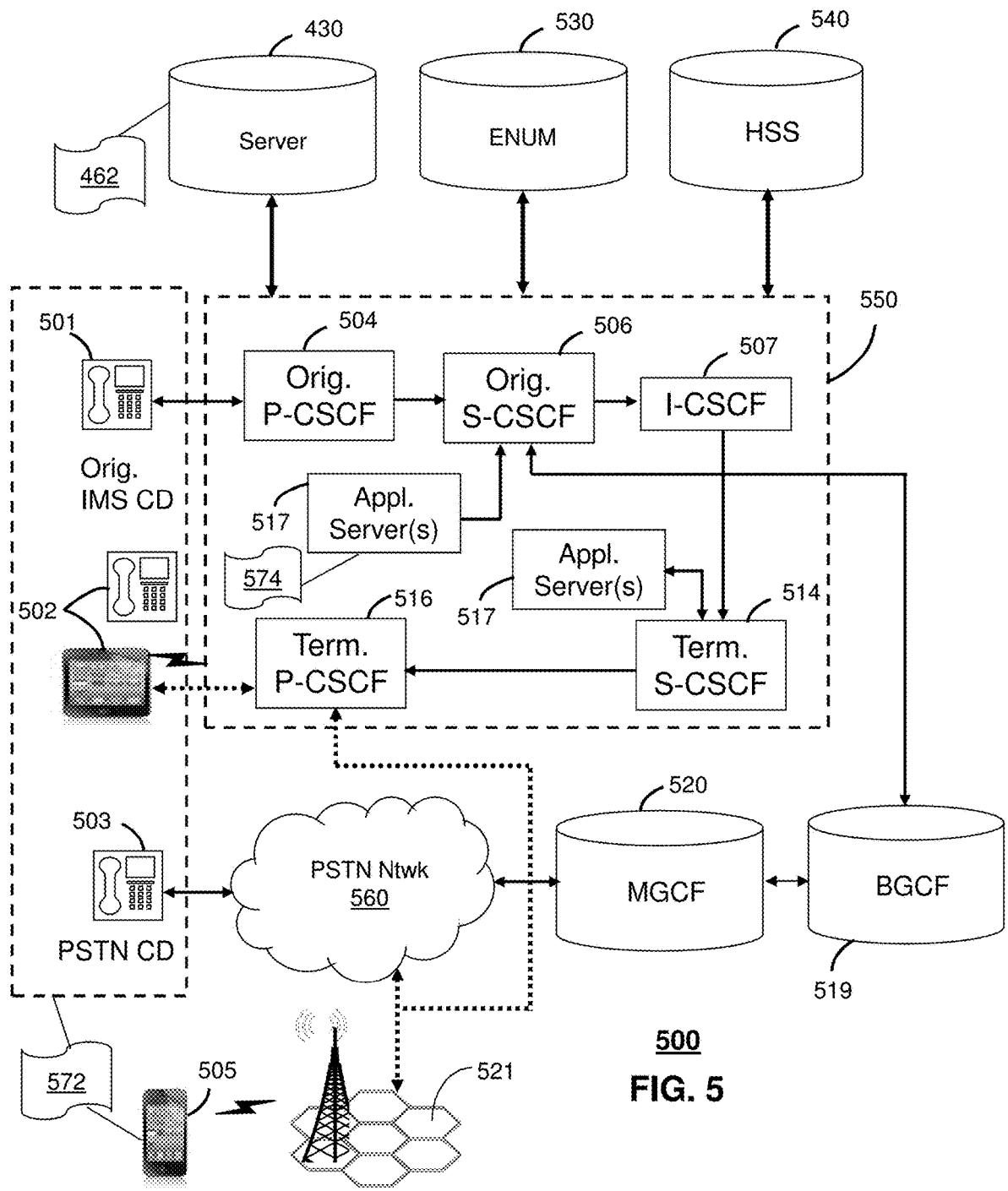

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100, 200 of FIGS. 1 and/or 2 and communication system 400 as another representative embodiment of communication system 400. For instance, one or more devices illustrated in the communication system 200 of FIG. 5, can identify a packet data protocol session that supports a first data exchange between a mobile application of a first mobile device and a first recipient device, determine a second recipient device, and facilitate a second data exchange between the mobile application and the second recipient device by way of the packet data protocol session, without modifying the first data exchange.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The multipoint access server 430 of FIG. 4 can be operably coupled to communication system 500 for purposes similar to those described above. The multipoint access server 430 can perform function 462 and thereby provide multipoint access services to the CDs 501, 502, 503 and 505 of FIG. 5, similar to the functions described for server 430 of FIG. 4 in accordance with process 300 of FIG. 3. CDs 501, 502, 503 and 505, which can be adapted with software to perform function 572 to utilize the services of the multipoint access server 430, similar to the functions described for communication devices 102, 112, 202, 212 of FIGS. 1 and/or 2 in accordance with process 300 of FIG. 3. The multipoint access server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
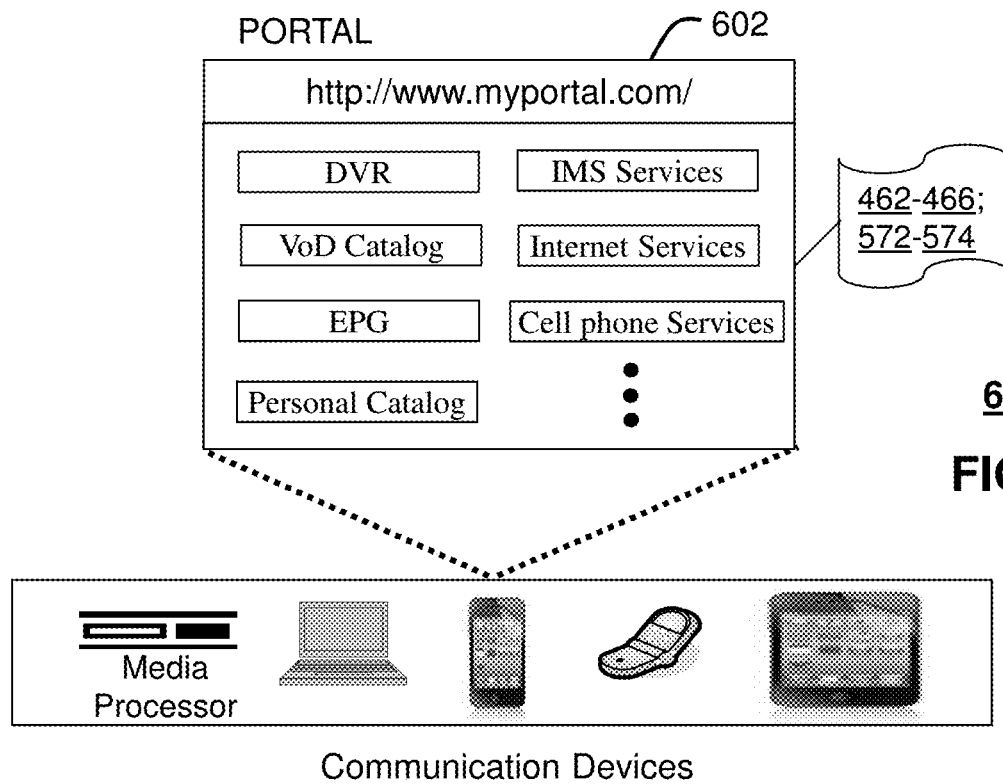
FIG. 6 depicts an illustrative embodiment of a web portal for interacting with the communication systems of FIGS. 1-2, and 4-5.

FIG. 6 depicts an illustrative embodiment of a web portal 602 of a communication system 600. Communication system 600 can be overlaid or operably coupled with systems 100, 200 of FIGS. 1 and/or 2, communication system 400, and/or communication system 500 as another representative embodiment of systems 100, 200 of FIGS. 1 and/or 2, communication system 400, and/or communication system 500. The web portal 602 can be used for managing services of systems 100, 200 of FIGS. 1 and/or 2 and communication systems 400-500. A web page of the web portal 602 can be accessed by a Uniform Resource Locator (URL) with an Internet browser using an Internet-capable communication device such as those described in FIGS. 1 and/or 2 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of systems 100, 200 of FIGS. 1 and/or 2, and communication systems 400-500. For instance, users of the services provided by server 134, 234 or server 430 can log into their on-line accounts and provision the servers 134, 234 or server 430 with lists of recipient devices, users, and/or devices with which data will be exchanged using a common point-to-point protocol. For example, an originating user can configure accomplish one or more of identifying destination(s), configure security features, e.g., encryption, establish, review and/or revise policies related to data distribution, and the like. The originating user can include users that provide a data stream to be distributed according to the techniques disclosed herein.

In some embodiments, the users of the services provided by the servers 134, 234, 430 can request data distributed by the originating user. For example, requests of data recipients can be lodged through an application. The application can present the requests to an entity, e.g., equipment of the originating user, for review, acceptance and/or denial. Alternatively or in addition, the application can review, accept and/or deny such requests based on a predetermine set of rules and/or policies. By way of example, rules or policies can be based on one or more of various factors, such as service level agreements of the originating user and/or the requesting user(s). Other factors can include network conditions, e.g., restricting distribution based on congestion conditions, equipment capabilities, e.g., whether a requesting device is capable of receiving or accessing the requested data. Equipment capabilities can include one or more of radio type, mobility network software support, screen resolutions, available data, etc. Other factors can include a number of requesting users, e.g., a threshold of supported recipients may be established after which further requests are denied, at least until the number of recipients falls below the threshold, and/or the threshold is increased. Still other factor can include a priority level of the distributed data, the originating user and/or the recipient user, a location of the originating and/or requesting recipient device, and the like.

Features, such as one or more of any of the foregoing examples can be programmed, for example, in user profiles that can be used to provide related information to the server 134, 234, 430 to enable it to communication with devices described in FIGS. 1-5, such as the applications 104, 204, the multiplexer 118, the policy database 132, the secure database 128, the RPM database 130, the policy profile register 108, 208, the mobile devices 112, 212, the management gateways, 219, the session border controllers 217, the service platform, 221, and so on. Service providers can log onto an administrator account to provision, monitor and/or maintain the systems 100, 200 of FIGS. 1 and/or 2 or server 430.

Figure 7:
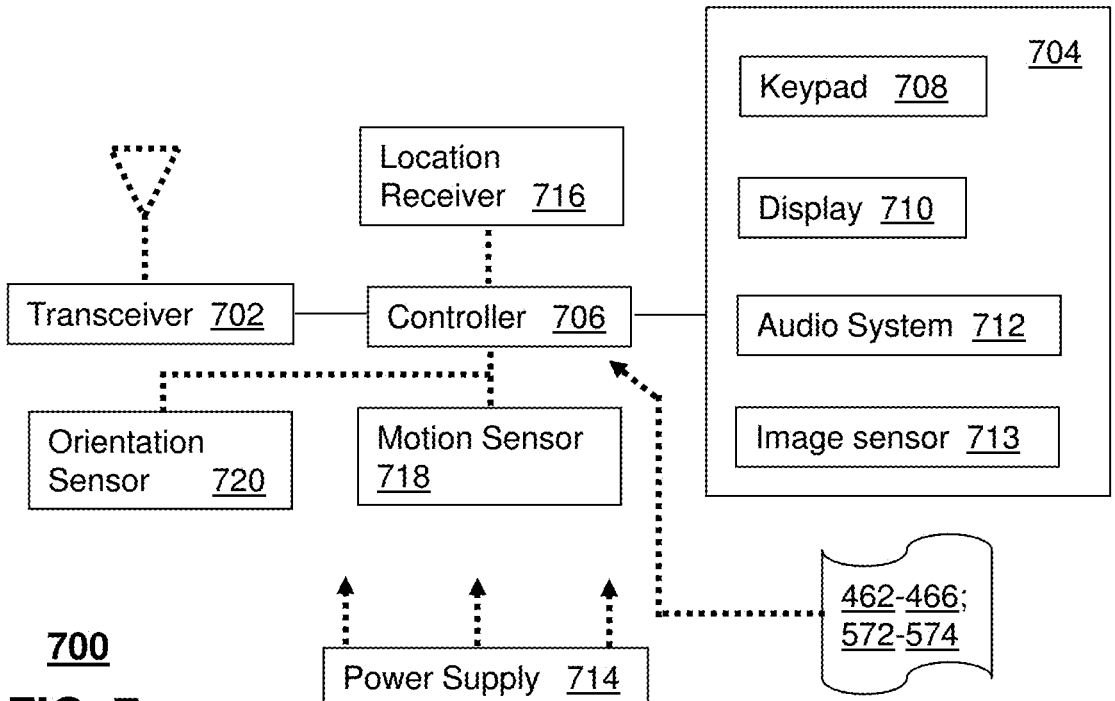
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and/or 2, and FIGS. 4-5 and can be configured to perform portions of the process 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1 and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems of FIGS. 1 and/or 2, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, the concepts of a multiplexer using a port forwarding algorithm and a daisy chain technique can be applied in various combinations. In a first example, a first multiplexer establishes network connections between a reference or source recipient device and multiple recipient devices, wherein, one of the recipient devices comprises a second multiplexer. The second multiplexer applies a second port forwarding algorithm, by which data obtained by way of a data connection from the first multiplexer at an input port of the second multiplexer, is distributed to one or more output ports of the second multiplexer. The process can be repeated in a like manner any number of times to very quickly achieve a very large number of recipient devices. In at least one example, a multiplexer can have up to about 64,000 ports.

Other configurations can include combinations of daisy chaining with multiplexer with port forwarding. For example, a multiplexer maintains a first data connection, e.g., a point-to-point connection with an originating network device, and multiple outputs to other recipient devices. At least one of the other recipient devices can establish subsequent data connections to yet other recipient devices, allowing for data obtained from the multiplexer to be distributed according to the subsequent data connections. The multiplexer and daisy chain techniques can be applied repeatedly in various combinations, without restriction. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
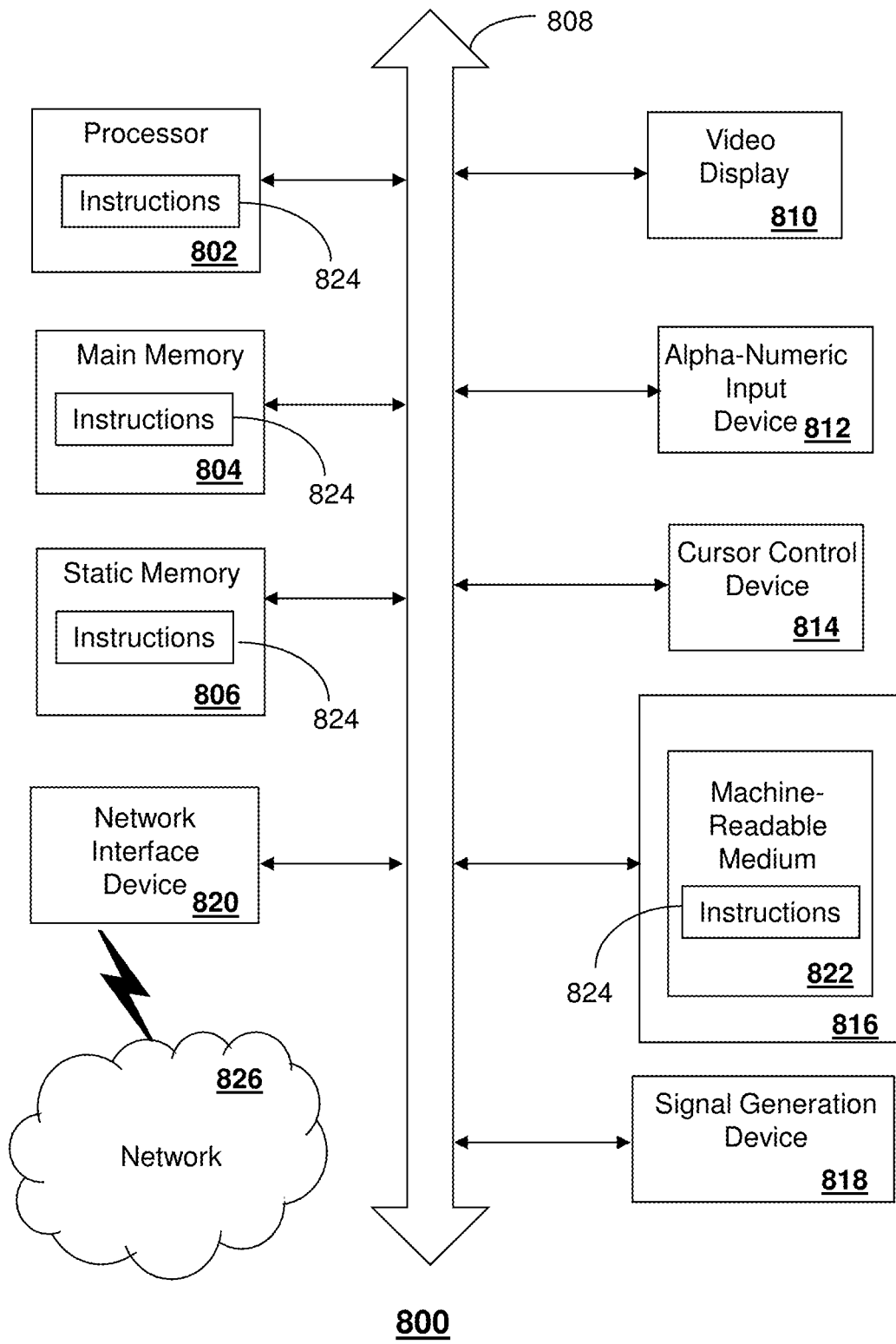
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the multipoint access server 134, 234, 430, the media processor 406, to enable it to communication with entities described in FIGS. 1-5, such as the applications 104, 204, the multiplexer 118, the policy database 132, the secure database 128, the RPM database 130, the policy profile register 108, 208, the mobile devices 112, 212, the management gateways, 219, the session border controllers 217, the service platform, 221 and other devices of FIGS. 1-2 and 4-7. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822, e.g., a device, on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
identifying a packet data protocol session that supports a first exchange of data between a mobile application of a first mobile device and a first recipient device, wherein the first exchange of data comprises a directing of the first exchange of data through a network element;
obtaining a request to identify a second recipient device, prior to a time of initiation of the first exchange of data;
in accordance with the request, identifying the second recipient device; and
initiating a second exchange of data between the mobile application and the second recipient device by way of the packet data protocol session,
wherein the packet data protocol session comprises a first point-to-point link between the mobile application and a first port of the network element and a second point-to-point link between a second port of the network element and the first recipient device,
wherein the second exchange of data also comprises a directing of the second exchange of data through the network element without modifying the first exchange of data,
wherein the second port of the network element is one of a plurality of ports of the network element providing a plurality of secure data connections, wherein each of the plurality of secure data connections is associated with a different predefined port of the plurality of ports of the network element.

2. The device of claim 1, wherein the initiating of the second exchange of data between the mobile application and the second recipient device by way of the packet data protocol session occurs without interrupting the directing of the first exchange of data through the network element.

3. The device of claim 1, wherein the packet data protocol session comprises a port forwarding between the first port of the network element and the second port of the network element, and
wherein the initiating of the second exchange of data between the mobile application and the second recipient device comprises a port forwarding between the first port of the network element and a third port of the network element, and a third point-to-point link between the third port of the network element and the second recipient device.

4. The device of claim 3, wherein the network element comprises a multiplexer, and wherein the first point-to-point link, the second point-to-point link, the third point-to-point link, or any combination thereof further comprises application of an encryption protocol to the first exchange of data, the second exchange of data, or both.

5. The device of claim 1, wherein the packet data protocol session comprises a first point-to-point link between the mobile application and the network element, and
wherein the initiating of the second exchange of data between the mobile application and the second recipient device comprises a second point-to-point link between the network element and the second recipient device.

6. The device of claim 1, wherein the first exchange of data between a mobile application of a first mobile device and a first recipient device and the second exchange of data between the mobile application and the second recipient device a common tunneling protocol.

7. The device of claim 6, wherein the common tunneling protocol comprises a real-time, peer-to-peer, streaming media exchange protocol.

8. The device of claim 1, wherein the identifying of the second recipient device is based on a request originating at the first mobile device, wherein the request identifies the second recipient device.

9. The device of claim 1, wherein the identifying of the second recipient device is based on a request originating at equipment of the second recipient device.

10. A method, comprising:
determining, by a processing system including a processor, a packet data protocol session that supports a first exchange of data between a mobile application of a first mobile device and a first recipient device wherein the first exchange of data comprises a directing of the first exchange of data through a network element;
obtaining a request to identify a second recipient device, prior to a time of initiation of the first exchange of data;
in accordance with the request, determining, by the processing system, the second recipient device; and
facilitating, by the processing system, a second exchange of data between the mobile application and the second recipient device by way of the packet data protocol session,
wherein the packet data protocol session comprises a first point-to-point link between the mobile application and a first port of the network element and a second point-to-point link between a second port of the network element and the first recipient device,
wherein the second exchange of data also comprises a directing of the second exchange of data through the network element without modifying the first exchange of data,
wherein the second port of the network element is one of a plurality of ports of the network element providing a plurality of secure data connections, wherein each of the plurality of secure data connections is associated with a different predefined port of the plurality of ports of the network element.

11. The method of claim 10, wherein the facilitating of the second exchange of data between the mobile application and the second recipient device by way of the packet data protocol session occurs without interrupting the directing of the first exchange of data through the network element.

12. The method of claim 10, wherein the packet data protocol session comprises a port forwarding between the first port of the network element and the second port of the network element, and
wherein the facilitating of the second exchange of data between the mobile application and the second recipient device comprises a port forwarding between the first port of the network element and a third port of the network element, and a third point-to-point link between the third port of the network element and the second recipient device.

13. The method of claim 12, wherein the network element comprises a multiplexer, and wherein the first point-to-point link, the second point-to-point link, the third point-to-point link, or any combination thereof further comprises application of an encryption protocol to the first exchange of data, the second exchange of data, or both.

14. The method of claim 10, wherein the packet data protocol session comprises a first point-to-point link between the mobile application the first recipient device, and
wherein the facilitating of the second exchange of data between the mobile application and the second recipient device comprises a second point-to-point link between the first recipient device and the second recipient device.

15. The method of claim 10, wherein the first exchange of data between a mobile application of a first mobile device and a first recipient device and the second exchange of data between the mobile application and the second recipient device a common tunneling protocol.

16. The method of claim 15, wherein the common tunneling protocol comprises a real-time, peer-to-peer, streaming media exchange protocol.

17. A machine-readable storage device, comprising executable instructions that, when executed by a processing system including a processor, facilitate performance of operations, comprising:
identifying a packet data protocol session that supports a first data exchange between a mobile application of a first mobile device and a first recipient device, wherein the first data exchange comprises a directing the first data exchange through a network device via a first port of the network device;
obtaining a request to identify a second recipient device, prior to a time of initiation of the first data exchange;
in accordance with the request, determining the second recipient device; and
facilitating a second data exchange between the mobile application and the second recipient device by way of the packet data protocol session, wherein the second data exchange is also directed through the network device without modifying the first data exchange, the second data exchange directed via a second port of the network device, wherein the second port of the network device is one of a plurality of ports of the network device providing a plurality of secure data connections, wherein each of the plurality of secure data connections is associated with a different predefined port of the plurality of ports of the network device.

18. The machine-readable storage device of claim 17, wherein the facilitating of the second data exchange between the mobile application and the second recipient device by way of the packet data protocol session occurs without interrupting the directing of the first data exchange through the network device.

19. The machine-readable storage device of claim 17, wherein the packet data protocol session comprises a first point-to-point link between the mobile application and the first port of the network device, a port forwarding between the first port of the network device and the second port of the network device, and a second point-to-point link between the second port of the network device and the first recipient device, and wherein the facilitating of the second data exchange between the mobile application and the second recipient device comprises a port forwarding between the first port of the network device and a third port of the network device, and a third point-to-point link between the third port of the network device and the second recipient device.

20. The machine-readable storage device of claim 19, wherein the first point-to-point link, the second point-to-point link, the third point-to-point link, or any combination thereof further comprises application of an encryption protocol to the first data exchange, the second data exchange, or both.

* * * * *